(12) United States Patent
Faucon et al.

(10) Patent No.: US 6,442,671 B1
(45) Date of Patent: Aug. 27, 2002

(54) SYSTEM FOR PRIMING A LATCH BETWEEN TWO MEMORIES AND TRANSFERRING DATA VIA THE LATCH IN SUCCESSIVE CLOCK CYCLE THEREAFTER

(75) Inventors: Christelle Faucon, Plascassier; Jean-Francois Duboc, Saint Lauren du Var, both of (FR)

(73) Assignee: Philips Semiconductors, New York, NY (US)

( * ) Notice: Subject to any disclaimer, the term of this patent is extended or adjusted under 35 U.S.C. 154(b) by 0 days.

(21) Appl. No.: 09/264,205

(22) Filed: Mar. 3, 1999

(51) Int. Cl.[7] .............................................. G06F 13/00
(52) U.S. Cl. ..................... 712/34; 711/220; 712/220; 712/35; 712/36; 712/42; 710/4
(58) Field of Search ..................... 711/1, 117, 214, 711/217, 220, 169; 712/200, 225, 220, 34, 1, 36, 42; 710/1, 3, 4, 61, 58, 33–35

(56) References Cited

U.S. PATENT DOCUMENTS

| | | | |
|---|---|---|---|
| 4,807,183 A | * 2/1989 | Kung et al. | 710/132 |
| 5,465,340 A | * 11/1995 | Creedon et al. | 710/26 |
| 5,572,690 A | * 11/1996 | Molnar et al. | 712/200 |
| 5,584,010 A | * 12/1996 | Kawai et al. | 711/117 |
| 5,598,408 A | * 1/1997 | Nickolls et al. | 370/351 |
| 5,809,552 A | * 9/1998 | Kuroiwa et al. | 711/169 |
| 5,940,876 A | * 8/1999 | Pickett | 711/220 |
| 6,009,493 A | * 12/1999 | Fujiyama | 711/1 |

OTHER PUBLICATIONS

"Multiplier–Accumulate Architecture", IBM TDB No. NN8706219, vol. 30, Issue 1, pp. 219–221; Jun., 1, 1987.*
Hwang, et al., Computer Architecture and Parallel Processing, pp. 769–700; McGraw–Hill, 1984.*

* cited by examiner

Primary Examiner—Meng-Al T. An
Assistant Examiner—Wen-Tai Lin
(74) Attorney, Agent, or Firm—Peter Zawilski

(57) ABSTRACT

A system for transferring data in a single clock cycle between a digital signal processor (DSP) and an external memory unit and method of same. The system includes a data transfer element coupled between the external memory unit and the DSP, where the data transfer element is adapted to transfer the data between the external memory unit and the DSP in a single clock cycle. In one embodiment, the data transfer element is a coprocessor including a plurality of latch devices coupled to buses between the DSP and the memory unit. A first set of data are transferred from a first memory unit (e.g., from either the DSP internal memory unit or the external memory unit, depending on the direction of the data transfer) into the coprocessor during a first clock cycle and out of the coprocessor to a second memory unit in a second clock cycle occurring immediately after the first clock cycle. Data subsequent to the first set are similarly transferred during each clock cycle occurring immediately thereafter, so that data are transferred out of the first memory unit and into the second memory unit each clock cycle.

10 Claims, 6 Drawing Sheets

SYSTEM FOR PRIMING A LATCH BETWEEN TWO MEMORIES AND TRANSFERRING DATA VIA THE LATCH IN SUCCESSIVE CLOCK CYCLE THEREAFTER

TECHNICAL FIELD

The present invention pertains to the field of integrated circuits. More specifically, the present invention pertains to a system and method for optimizing memory exchanges between a digital signal processor and an external memory.

BACKGROUND ART

Digital integrated circuits (e.g., processors, specifically digital signal processors) used in computer systems are increasingly powerful, and the rate at which they process data continues to get faster. To maximize the functionality and performance of the computer system, it is imperative that the supply of data to the processor keep up with, to the extent possible, the rate at which the data are required by the application being executed by the processor.

A digital signal processor (DSP) system of the prior art is the OAK™ DSP core licensed from DSP Semi Conductor by VLSI Technology, Inc. In the OAK digital signal processor system, the DSP core includes a digital signal processor and internal memory (that is, memory that is on-core). The internal memory, by virtue of being located on the DSP core, is directly accessible by the DSP and thus able to transfer data very quickly to the DSP. Hence, data contained in the on-core memory are readily available to the DSP; therefore, by using the data from internal memory, the application can be optimally run at the speed of the processor. However, the internal memory is relatively small and limited in size by the on-core space that is available. In the OAK DSP core, for example, there is typically a total of 4K of on-core memory which is configured as two separate memories of 2K each. This amount of memory is not sufficient to hold the large quantities of data that are typically acquired and require processing.

In the prior art, the shortcoming with regard to on-core memory is addressed by supplementing the internal memory with external, or off-core, memory. The external memory is not limited by space considerations, and thus is capable of providing the space needed to store larger quantities of data. However, data stored in external memory need to be retrieved from there and delivered to the DSP core in order to be processed, and the processed data may need to be subsequently returned to external memory. Thus, the performance of the DSP system is limited by the speed at which data can be transferred over the data bus from the external memory to the DSP core, and likewise from the DSP core to external memory.

In the prior art, each transfer of data from external memory to internal memory, or from internal memory to external memory, takes at least two (2) clock cycles. Thus, in general, it takes 2N clock cycles to transfer N units (e.g., blocks or tables) of data. It is desirable to reduce the number of clock cycles required to transfer a given amount of data, so that data are transferred more quickly and overall system performance is improved.

In addition, the prior art is problematic because the size of the instruction sets (e.g.,.the code size) increases the size of the memory and thus also increases the overall size of the DSP system. Thus it is also desirable to reduce the size of the instruction set.

Accordingly, what is needed is a method and/or system that addresses the limitation placed on DSP system performance by the need to transfer data from off-core memory to on-core memory and by the rate at which those data are transferred over the data bus. What is further needed is a system and/or method that addresses the above need and utilizes an efficient instruction set. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a system and method that addresses the limitation on digital signal processor (DSP) system performance by reducing the number of clock cycles required to transfer data between internal and external memory. The present invention also reduces the size of the instruction set, thereby reducing the size of the memory and thus also reducing the overall size of the DSP system.

The present invention pertains to a system for transferring data in a single clock cycle between a digital signal processor (DSP) core and a memory unit, and method of same. The system includes the memory unit, a plurality of buses coupled to the memory unit, and the DSP core coupled to the plurality of buses. The system also includes a data transfer element coupled between the memory unit and the DSP core, where the data transfer element is adapted to transfer the data between the memory unit and the DSP core in a single clock cycle. The present invention functions by pipelining the data from the memory unit to the DSP core in a single clock cycle after the pipeline has been primed.

In one embodiment, the memory unit is external to the DSP core. In this embodiment, the data transfer element is a coprocessor including a plurality of latch devices coupled between the DSP core and the external memory unit via a plurality of data buses, respectively. The latch devices provide intermediate registers in the coprocessor for storing the data being transferred between the DSP core and the external memory unit. Data are transferred into the coprocessor during a first clock cycle and out of the coprocessor in a second clock cycle immediately following the first clock cycle.

In the present embodiment, a first set of data are transferred from one memory unit (e.g., from either the internal memory unit of the DSP core or from the external memory unit, depending on whether the transaction is a write transaction or a read transaction) into the coprocessor during the first clock cycle and out of the coprocessor to the other memory unit (e.g., to either the external memory unit or the internal memory unit of the DSP core, again depending on whether the transaction is a write transaction or a read transaction) in the second clock cycle occurring immediately after the first clock cycle. Data subsequent to the first set are likewise transferred from one memory unit to the coprocessor during each consecutive clock cycle occurring immediately after the first clock cycle, and from the coprocessor to the other memory unit during each consecutive clock cycle occurring immediately after the second clock cycle. Thus, data are pipelined out of one memory unit and into the other each clock cycle after the pipeline is primed.

In the present embodiment, an address bus is coupled between the DSP core and the external memory unit, and an address modification and decode mechanism is coupled to the address bus. In this embodiment, the address modification and decode mechanism is an offset register, wherein an offset value is specified and applied in order to map a first address in one memory unit to a second address in the other memory unit (e.g., an address in the internal memory of the DSP core is mapped to an address in the external memory, and vice versa).

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
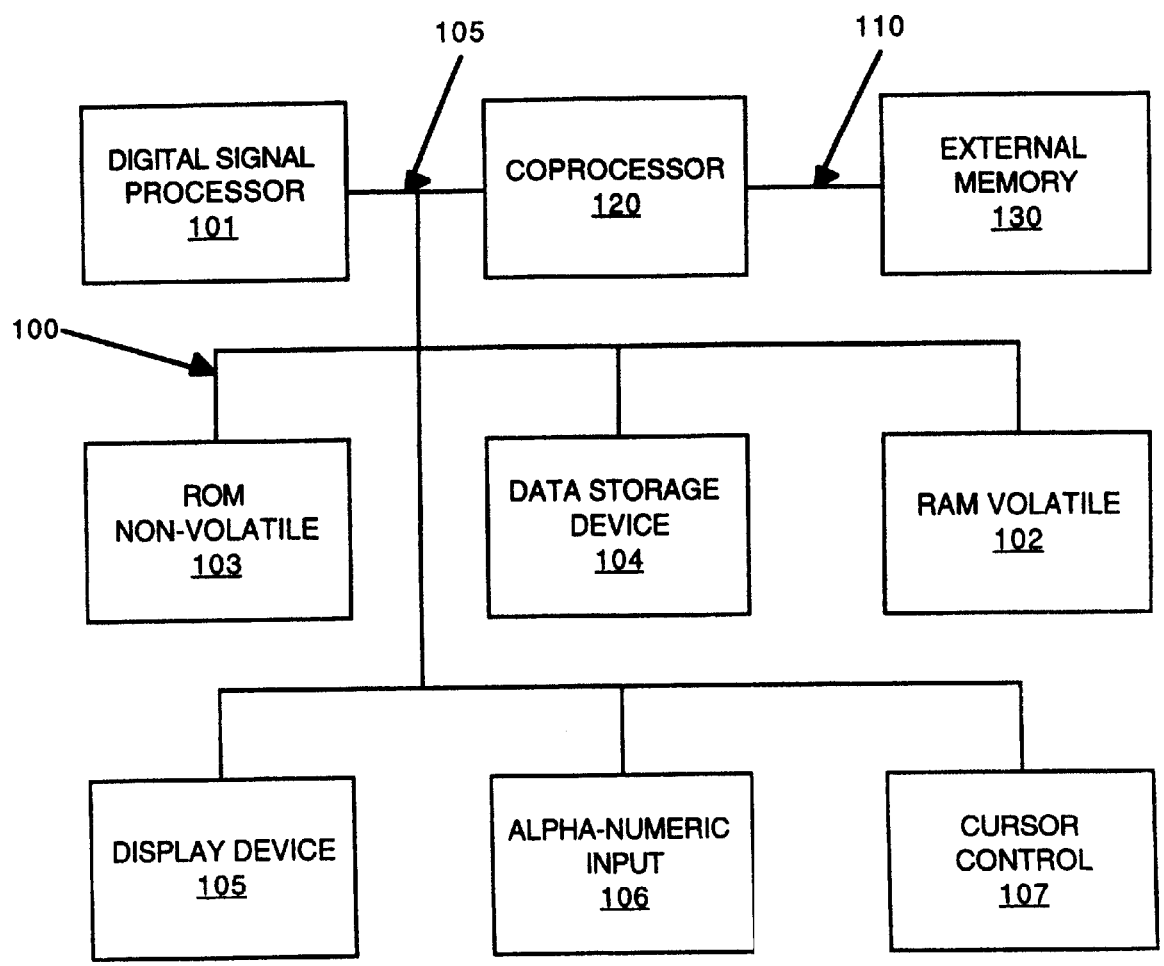
FIG. 1 is a block diagram of a general purpose computer system upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the preferred embodiments of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, "transaction" or "transfer" refers to the transmission or receipt of data or other such message information. The transaction or transfer may consist of all data associated with a particular computer system operation (e.g., a request or command). A transaction or transfer may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device (e.g., process 400 of FIG. 4). The computer system or similar electronic computing device manipulates and transforms data represented as physical (electronic) quantities within the computer system memories, registers or other such information storage, transmission or display devices.

Refer to FIG. 1 which illustrates an exemplary general purpose computer system 190 in which the present invention can be implemented. However, it is understood that computer system 190 is an exemplary system and that other computer system configurations may be used in accordance with the present invention.

In general, computer system 190 used by the embodiments of the present invention comprises bus 100 for communicating information and digital signal processor 101 coupled with bus 100 for processing information and instructions. In the present embodiment, digital signal processor 101 is a digital signal processor (DSP) core such as the OAK™ DSP core licensed from DSP Semi Conductor by VLSI Technology, Inc., although it is appreciated that other processor configurations may be used in accordance with the present invention. In this embodiment, digital signal processor 101 includes an internal memory unit or units (e.g., an on-core memory). In the present embodiment, digital signal processor 101 includes two separate random access memory (RAM) units (not shown).

Continuing with reference to FIG. 1, computer system 190 further comprises random access memory ("RAM volatile") 102 coupled with bus 100 for storing information and instructions for digital signal processor 101, read-only memory ("ROM non-volatile") 103 coupled with bus 100 for storing static information and instructions for digital signal processor 101, data storage device 104 such as a magnetic or optical disk and disk drive coupled with bus 100 for storing information and instructions, display device 105 coupled to bus 100 for displaying information to the computer user, optional alphanumeric input device 106 including alphanumeric and function keys coupled to bus 100 for communicating information and command selections to digital signal processor 101, and cursor control device 107 coupled to bus 100 for communicating user input information and command selections to digital signal processor 101.

The present invention is a data transfer element coupled between digital signal processor 101 and external memory 130 via bus 105 and bus 110. In the present embodiment, the data transfer element is coprocessor 120. As will be seen below in conjunction with FIG. 2, bus 105 can comprise a plurality of address buses and data buses for coupling digital signal processor 101 to different elements and devices that are incorporated within coprocessor 120. Similarly, bus 110 can comprise a plurality of address buses and data buses for coupling the elements and devices within coprocessor 120 to external memory 130.

In general, external memory 130 represents a memory unit external to digital signal processor 101 (that is, external to the DSP core). In one embodiment, external memory 130 can be a cache memory coupled, for example, by a bus (not shown) to the main memory (e.g., RAM volatile 102 and ROM non-volatile 103) of computer system 190. In another embodiment, external memory 130 can be a cache memory or a register (not shown) located within the computer system's main memory.

Figure 2:
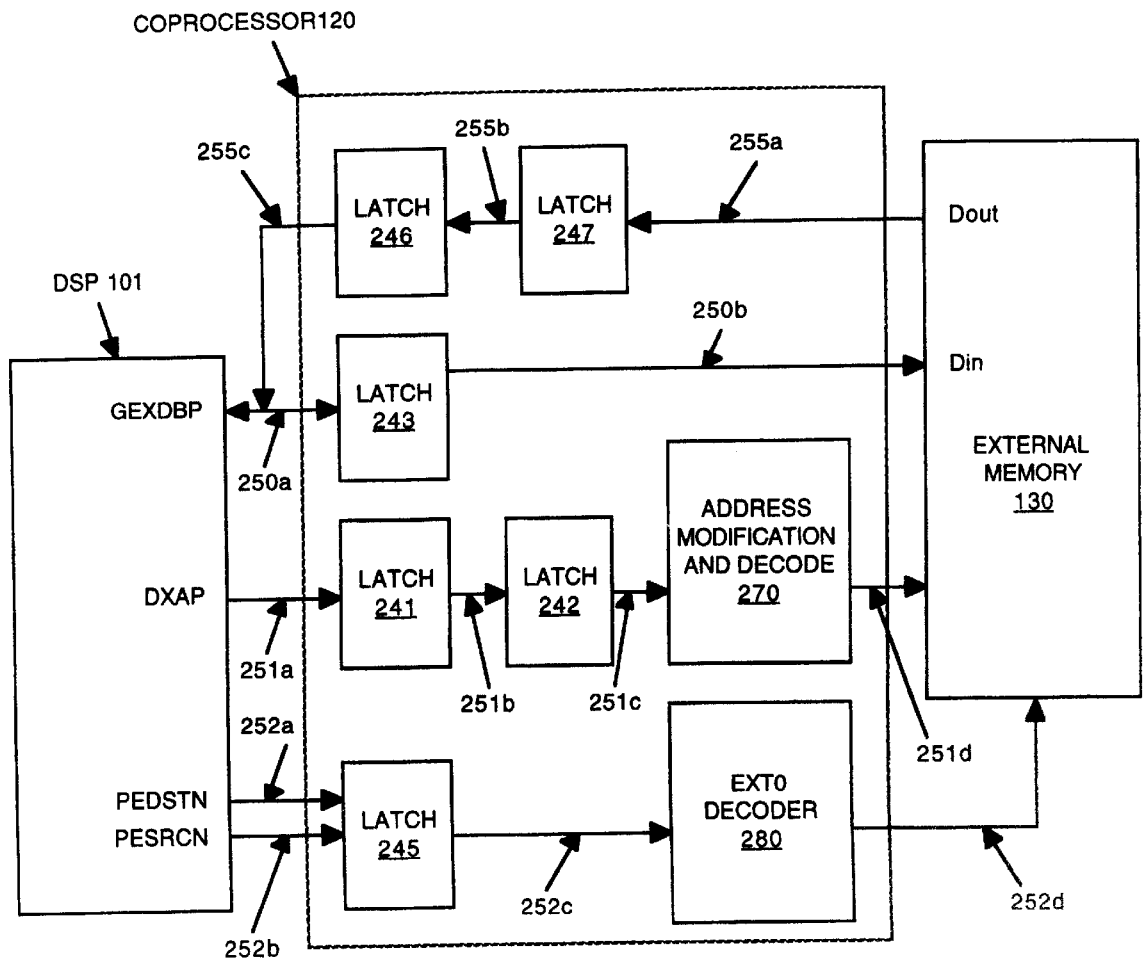
FIG. 2 is a block diagram of one embodiment of the data transfer element (e.g., a coprocessor) used in accordance with the present invention.

With reference now to FIG. 2, one embodiment of coprocessor 120 is illustrated in accordance with the present invention. As explained above, coprocessor 120 is coupled between digital signal processor 101 (hereinafter, DSP 101) and external memory 130. Coprocessor 120 introduces the capability for direct memory access between DSP 101 and external memory 130.

Coprocessor 120 is comprised of a plurality of latches 241, 242, 243, 245, 246 and 247. The function and operation of latches are well known in the art. In the present embodiment, the latches are 16-bit latches although it is understood that different latch sizes may be used in accordance with the present invention.

Latches 241 and 242 are coupled to the DXAP bus represented by 251a, 251b, 251c and 251d (collectively referred to herein as DXAP bus 251). DXAP bus 251 is an address bus that is used to read or write an address between DSP 101 and external memory 130. In the present embodiment, DXAP bus 251 is a 16-bit bus and each address is 16 bits in length, although it is understood that a bus and address range other than 16 bits may be used in accordance with the present invention.

Address modification and decode 270 is coupled to DXAP bus 251. Address modification and decode 270 is used to map an address in the internal memory of DSP 101 to an address in external memory 130, and vice versa. Additional information regarding address modification and decode 270 is provided below in conjunction with FIG. 3.

Continuing with reference to FIG. 2, latch 243 is coupled to the portions of the GEXDBP bus represented by 250a and 250b, and latches 246 and 247 are coupled to the portions of the GEXDBP bus represented by 255a, 255b and 255c. External memory 130 is coupled to latches 243 and 247 by, respectively, GEXDBP bus 250b and 255a. GEXDBP bus 250a is a data bus used for transferring data to and from DSP 101. GEXDBP bus 250b is a latched data bus for transferring the data from latch 243 to external memory 130. For a write transaction from on-core memory (from DSP 101) to off-core memory (to external memory 130), latch 243 is embodied as an external register referred to in the instruction set as "ext0." GEXDBP buses 255a, 255b and 255c transfer data from external memory 130 through latches 246 and 247, respectively, to GEXDBP bus 250a. For a read transaction from off-core memory to on-core memory, latches 246 and 247 are embodied as external registers likewise referred to in the instruction set as "ext0." PEDSTN bus 252a and PESRCN bus 252b are each coupled to latch 245, which is coupled via bus 252c to ext0 decoder 280. Ext0 decoder 280 is coupled via bus 252d to external memory 130. Ext0 decoder 280 is an address decoder of a type well known in the art. Read and write signals are generated by decoding the signal either from PEDSTN bus 252a or from PESRCN bus 252b in ext0 decoder 280. The PEDSTN signal indicates a write transaction (e.g., ext0 write) to external memory 130, and the PESRCN signal indicates a read transaction (e.g., ext0 read) from external memory 130.

Figure 3:
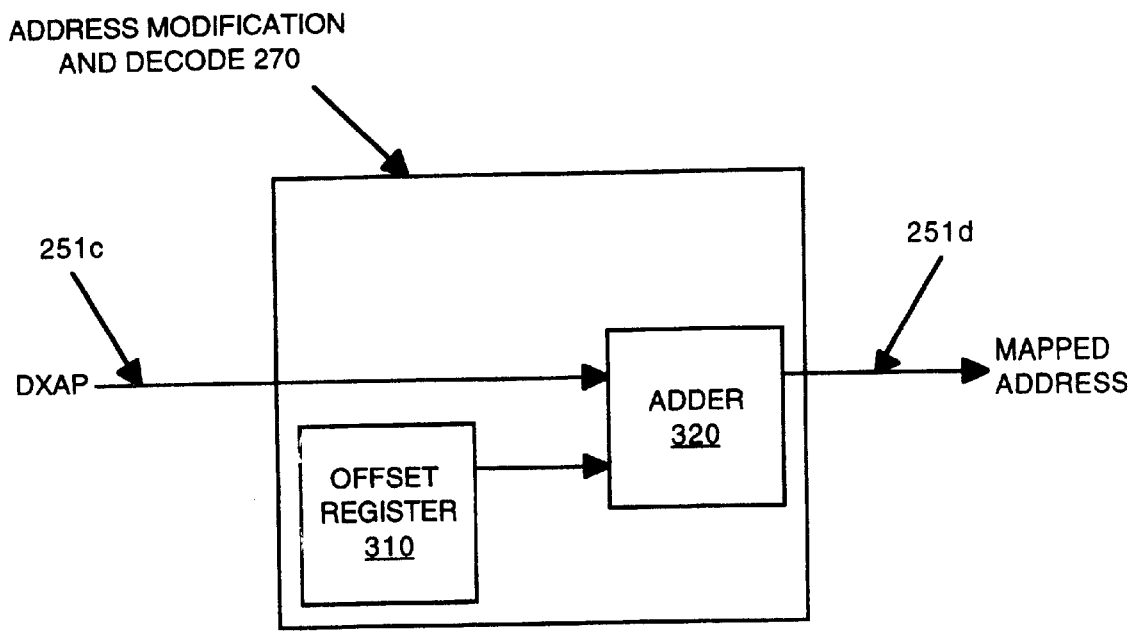
FIG. 3 is a block diagram of an address modification and decode mechanism in accordance with one embodiment of the present invention.

FIG. 3 shows additional detail regarding address modification and decode 270. Address modification and decode 270 comprises offset register 310 and adder 320. In the present embodiment, adder 320 is a 16-bit adder although it is appreciated that a range other than 16 bits can be used in accordance with the present invention.

To generate an address in external memory 130 using a particular address from DSP 101, the address from DSP 101 is provided as input to address modification and decode 270 via DXAP bus 251c. Offset register 310 is initialized with an offset value which is added to the address from DSP 101 to map that address to an address in external memory 130. The offset value in offset register 310 can be subsequently changed during operation. Thus, data can be saved to a selected location in external memory 130 by specifying the appropriate offset value. By using address modification and decode 270, two addresses are generated per clock cycle.

For example, data at address 0 in the internal memory of DSP 101 is mapped to address 8000 in external memory 130 by specifying an offset value of 8000 in offset register 310. Similarly, address 1 in internal memory would be mapped to address 8001 in external memory 130, and so on for subsequent addresses.

In this manner, the address from the internal memory of DSP 101 is used to generate an address in external memory 130. In a similar manner, an address in external memory 130 is mapped to an address in DSP 101 by subtracting the offset value from the address in external memory 130. Thus, in accordance with the present invention, it is not necessary to build an address generator in coprocessor 120 (FIG. 2), thereby minimizing the number of gates needed in coprocessor 120 and consequently reducing costs.

Figure 4:
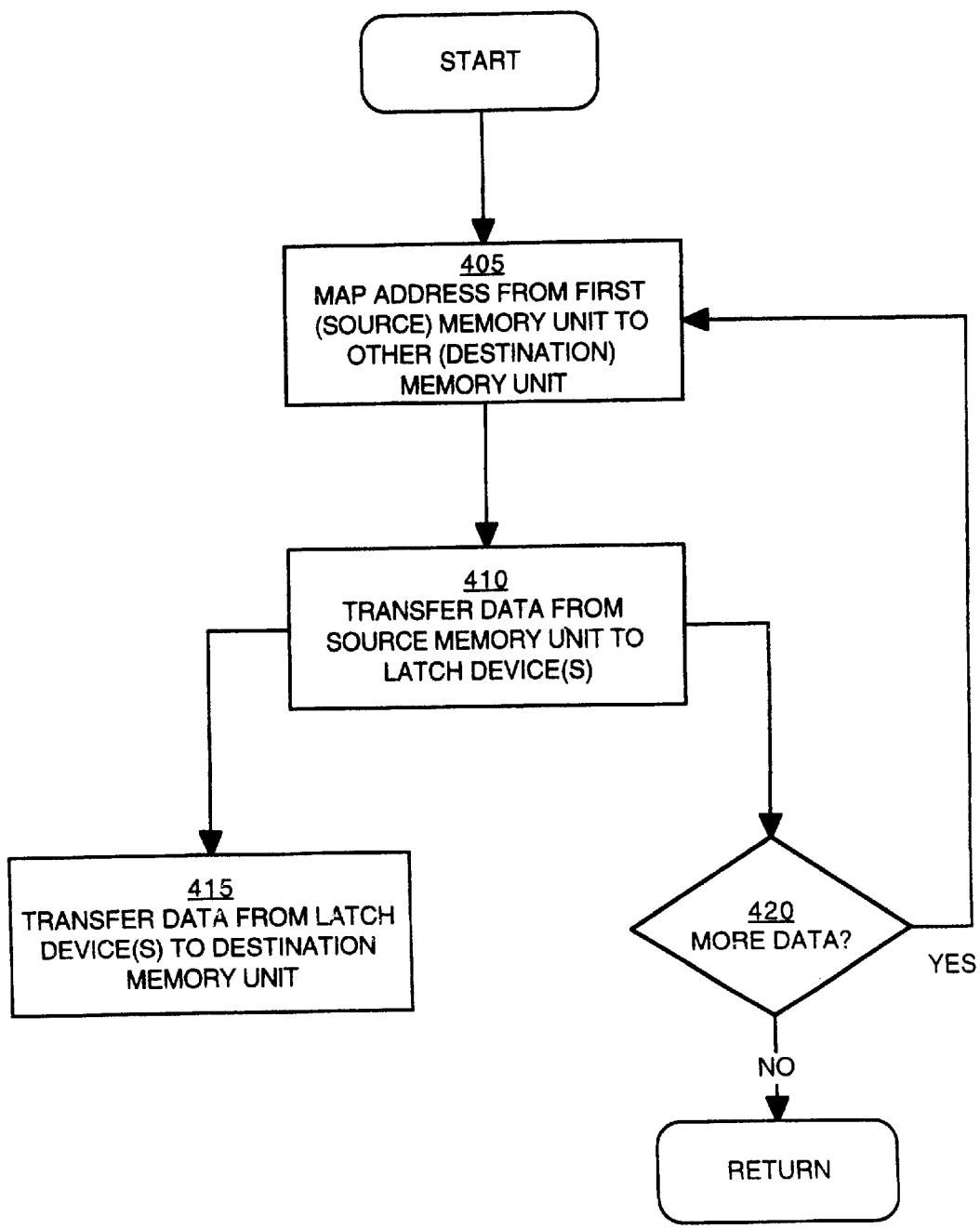
FIG. 4 is a flowchart of a process for transferring data between a processor and a memory unit in accordance with one embodiment of the present invention.

Refer now to FIG. 4, which is a flowchart of process 400 used to transfer data between DSP 101 and external memory 130 via coprocessor 120 in accordance with one embodiment of the present invention. Process 400 is implemented via instructions stored in and executed by DSP 101. Process 400 results in the transfer of data between DSP 101 and external memory 130 in a single clock cycle. The timing associated with process 400 is described further below in conjunction with the timing cycle diagrams illustrated in FIGS. 5 and 6.

In step 405 of FIG. 4, as explained in conjunction with FIG. 3, an address in the source memory unit is mapped to an address in the destination memory unit (e.g., one of either internal memory of DSP 101 or external memory 130 is the source memory unit and the other is the destination memory unit, depending on whether the transaction is a write transaction or a read transaction).

In step 410 of FIG. 4, with reference also to FIG. 2, data are transferred from the source memory unit to coprocessor 120, which provides an intermediate location for the data between the source memory unit and the destination memory unit. For example, in a write transaction from DSP 101 to external memory 130, data are transferred from the internal memory of DSP 101 to latch 243 via GEXDBP bus 250a.

In step 415 of FIG. 4, with reference also to FIG. 2, data are transferred from coprocessor 120 to the destination memory unit. Continuing with the example from above, data are transferred from latch 243 to external memory unit 130 via GEXDBP bus 250*b*.

In step 420 of FIG. 4, if there is no more data to be transferred from the source memory unit, process 400 is complete. If more data are to be transferred, steps 405, 410 and 415 are repeated for the next set of data. For the subsequent sets of data, in accordance with the present invention, step 410 and step 415 are performed at the same time. That is, consider two consecutive sets of data being transferred from the source memory unit to the destination memory unit. The first set of data is transferred to coprocessor 120 and then to the destination memory unit. While the first set of data is transferred from coprocessor 120 to the destination memory unit, the second set of data is transferred to coprocessor 120 from the source memory unit. This sequence is repeated for subsequent sets of data. Thus, while one set of data is exiting from one end of the pipeline that runs between DSP 101 and external memory 130, at the other end of the pipeline the next set of data is entering the pipeline.

Hence, in accordance with the present invention, the next set of data is transferred from the source memory unit to coprocessor 120 at the same time (that is, during the same clock cycle) that the preceding set of data is transferred from coprocessor 120 to the destination memory unit. Thus, during each clock cycle after the first clock cycle that corresponded to the first data transfer from the source memory unit to coprocessor 120, data are pipelined into the source memory unit. The first set of data takes two clock cycles to be pipelined from the source memory unit to the destination memory unit, but data are transferred into the destination memory unit during each single clock cycle after the second clock cycle (e.g., after the pipeline has been primed).

Therefore, only N+1 clock cycles are required to transfer N units (e.g., blocks or tables) of data in accordance with the present invention. This represents a significant reduction over the prior art in the number of clock cycles required to transfer the same amount of data. The present invention reduces the number of clock cycles needed to transfer a given amount of data by approximately one-half.

The instruction set for accomplishing steps 405, 410 and 415 is exemplified by the following instruction set, where r1 is a register inside DSP 101 that is the source for data to be read to external memory 130, r2 is the offset register, r0 is a register inside DSP 101 for receiving data written from external memory 130, ext0 is as defined above, and N is the number of units of data to be transferred:

```
;offset write
mov offset_reg_address, r2
mov offset_value, r1
mov r1, (r2)                   [take content of r1, save it to address
                                pointed to by r2]
;on-core address to read
mov ##add_oncore, r1           [initialize first address in DSP of
                                data to be read]
;transfer from on-core to off-core
rep #N-1                       [repeat next instruction N-1 times]
mov (r1) +, ext0               [read from DSP and save in external
                                memory via ext0]
;read back                     [source is external memory]
mov ##addp_write, r0           [initialize first address in DSP where
                                data is to be written]
mov ext0, (r0)                 [dummy write to start data pipeline]
rep #N-1
mov ext0, (r0) +               [read from external memory and save
                                in DSP via ext0]
```

The instruction set utilized in accordance with the present invention is devised to minimize the number of instructions required in order to effectively execute the data transfer from source memory to destination memory. Consequently, the size of the memory and thus the overall size of the DSP system are reduced.

Figure 5:
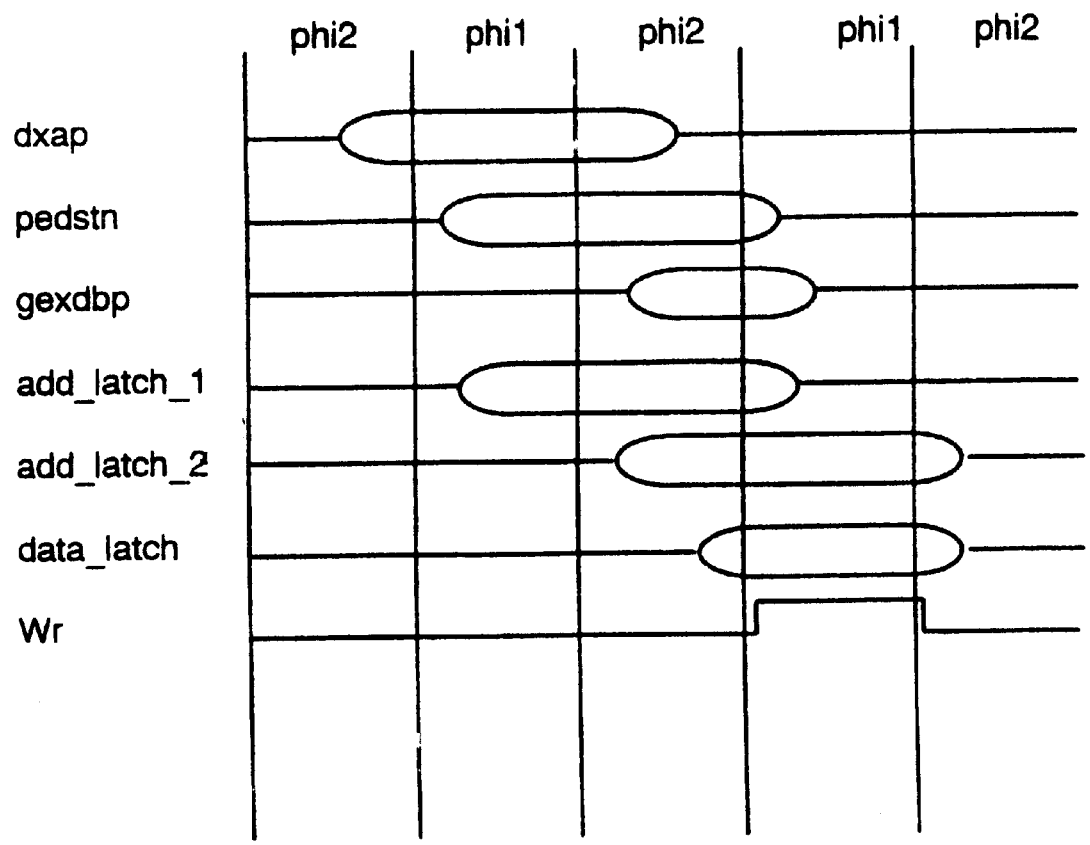
FIG. 5 is a timing cycle diagram illustrating a write transaction from a processor to a memory unit in accordance with one embodiment of the present invention.

Refer now to FIG. 5, which illustrates timing cycle diagram 500 for a write transaction from a processor (e.g., DSP 101 of FIG. 2) to a memory unit (e.g., external memory 130 of FIG. 2) in accordance with one embodiment of the present invention data transfer element (e.g., coprocessor 120). Clock cycles are generated by DSP 101 to synchronize operations occurring in DSP 101, coprocessor 120 and external memory 130. "Phi1" and "phi2" refer to the two phases of each clock cycle. Thus, phi1 plus phi2 is equivalent to a single clock cycle. In the timing cycle diagrams herein, when phi2 is indicated as occurring then phi2 is high and phi1 is low; and likewise, when phi1 is indicated as occurring, then phi1 is high and phi2 is low.

With reference to both FIGS. 2 and 5, during the first phi2 phase, DXAP bus 251*a* ("dxap") indicates the address in DSP 101 for the first set of data to be written to external memory 130. In the first phi1 phase, PEDSTN bus 252*a* ("pedstn") indicates that the transaction is a write transaction ("Wr") to external memory 130. Also in the first phi1 phase, DXAP bus 251*b* ("add_latch_1") takes the address from DXAP bus 251*a*. Similarly, in the second phi2 phase, DXAP bus 251*c* ("add_latch_2") takes the address from DXAP bus 251*b*. Also in the second phi2 phase, GEXDBP bus 250*a* ("gexdbp") takes the data to be transferred from DSP 101 to latch 243, and GEXDBP bus 250*b* ("data_latch") takes the data from latch 243 to external memory 130.

Timing cycle diagram 500 illustrates that the transaction associated with the transfer of the first set of data begins in the first phi2 phase and is completed in the third phi2 phase, which is equivalent to two clock cycles. However, in accordance with the present invention, as the first set of data is exiting the pipeline between DSP 101 and external memory 130, the second set of data is entering the pipeline. In other words, at any time there are two sets of data in the pipeline, one each at either end. Thus, although the first set of data takes two clock cycles to complete its transfer from DSP 101 to external memory 130, each clock cycle thereafter another set of data completes its transfer because each subsequent transfer overlaps the preceding transfer by one clock cycle.

Figure 6:
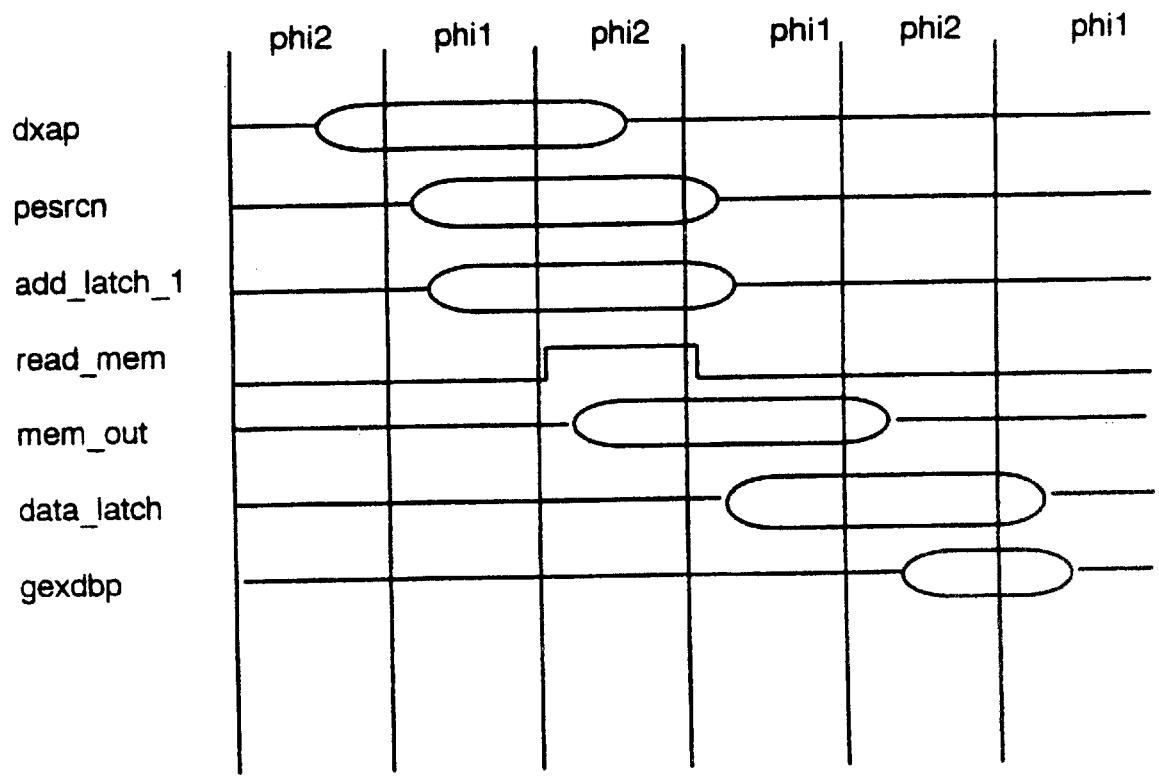
FIG. 6 is a timing cycle diagram illustrating a read transaction from a memory unit to a processor in accordance with one embodiment of the present invention.

Refer now to FIG. 6, which illustrates timing cycle diagram 600 for a read transaction from a memory unit (e.g., external memory 130) to a processor (e.g., DSP 101) in accordance with one embodiment of the present invention data transfer element (e.g., coprocessor 120).

With reference to both FIGS. 2 and 6, during the first phi2 phase, DXAP bus 251*a* ("dxap") indicates the address in internal memory that will be used to generate the address in external memory 130 for the data that are to be written to DSP 101. In the first phi1 phase, PESRCN bus 252*b* ("pesrcn") indicates that the transaction is a read transaction ("read_mem") from external memory 130. In the second phi2 phase, bus 256*a* ("mem_out") takes the first set of data from external memory 130, and the first set of data is passed through latch 247. In the second phi1 phase, the first set of data is passed through latch 246 to bus 255*c* ("data_latch"). In the third phi2 phase, GEXDBP bus 250*a* ("gexdbp") takes the first set of data and transfers it to DSP 101.

The transfer of the first set of data thus starts in the second phi2 phase and is completed in the third phi1 phase, which is equivalent to two clock cycles. However, in accordance with the present invention, the second set of data is prepared concurrent with the transfer of the first set of data, and in the next clock cycle follows the first set of data down the pipeline from external memory 130 to DSP 101. That is, looking at the signals on bus 256*a* ("mem_out"), the first set of data is transferred out of external memory 130 starting in the second phi2 phase. In the third phi2 phase, in accordance with the present invention, a second set of data (not shown) is transferred out of external memory 130 immediately behind the first set of data. Thus, the two sets of data are transferred out of external memory 130 two phases, or one clock cycle, apart.

Looking now at the signals on GEXDBP bus 250*a* ("gexdbp"), the first set of data is transferred into DSP 101 during the third phi2 phase and third phi1 phase. The second set of data is transferred into DSP 101 immediately behind the first set of data (e.g., one clock cycle later). Thus, after the first set of data has completed the transfer from external memory 130 to DSP 101, subsequent sets of data each arrive at DSP 101 every single cycle thereafter.

In summary, the present invention provides a system and method that improves digital signal processor system performance by reducing the number of clock cycles required to transfer data between the internal memory of the DSP core (e.g., on-core memory) and external memory (e.g., off-core memory). The present invention therefore allows the DSP core to advantageously utilize the expanded memory capability permitted by an external memory unit, because an external memory unit is not constrained by the space limitations associated with on-core memory.

In the present embodiment, the present invention implements a coprocessor (e.g., coprocessor 120 of FIG. 2) coupled between the DSP core and the external memory. The coprocessor accomplishes the transfer of data into either the internal memory or the external memory (depending on whether the transaction is a read or a write transaction) in a single clock cycle, thus reducing by approximately one-half the number of clock cycles needed to transfer a given amount of data.

The present invention also utilizes an address mechanism (e.g., address modification and decode 270 of FIG. 2) that permits an address in one memory unit to be mapped into the other memory unit without having to build an address generator in the coprocessor.

The preferred embodiment of the present invention, a coprocessor for fast memory transaction, is thus described. While the present invention has been described in particular embodiments, it should be appreciated that the present invention should not be construed as limited by such embodiments, but rather construed according to the following claims.

What is claimed is:

1. A system for transferring data between a digital signal processor (DSP) and a memory unit external to said DSP, said system comprising:

a memory unit the memory unit external to said DSP;

a plurality of buses coupled to said memory unit;

the DSP coupled to said plurality of buses, said DSP for receiving data from said memory unit and for processing an application to generate therefrom data to be stored in said memory unit; and a data transfer element coupled between said memory unit and said DSP, wherein said data are transferred into said data transfer element during a first clock cycle and out of said data transfer element during a second clock cycle immediately following said first clock cycle, said data transfer element comprising:

a first data bus coupled between said DSP and said memory unit, said first data bus for transferring a first set of data from said DSP to said memory unit;

a first latch device coupled to said first data bus;

a second data bus coupled between said DSP and said memory unit, said second data bus for transferring a second set of data from said memory unit to said DSP; and a second latch device coupled to said second data bus;

said first latch device and said second latch device providing intermediate locations for storing said first and second sets of data between said DSP and said memory unit;

an address bus coupled between said DSP and said memory unit; and an address mechanism coupled to said address bus, said address mechanism for mapping an address in said DSP to an address in said memory unit, wherein a specified offset value is added to said address in said DSP to generate said address in said memory unit.

2. The system of claim 1 wherein said second data bus is coupled to said memory unit at one end and to said first data bus at the other end.

3. The system of claim 1 further comprising a third latch device coupled to said second data bus, said third latch device providing an intermediate location for storing said data between said DSP and said memory unit.

4. The system of claim 1 further comprising a fourth latch device and a fifth latch device coupled to said address bus.

5. The system of claim 1 wherein said specified offset value is changed to a different value to map said address in said DSP to a different address in said memory unit.

6. In a computer system comprising a digital signal processor (DSP), an external memory unit and a data transfer element coupled between said DSP and said external memory unit, a method for transferring data between an internal memory unit of said DSP and said external memory unit in a single clock cycle, said method implemented by said DSP executing instructions contained in said internal memory unit and comprising the steps of:

a) mapping a first address in a first memory unit to a second address in a second memory unit, said step a) comprising:
   specifying an offset value; and
   applying said offset value to said first address to map said first address to said second address;

b) transferring a first set of data from said first memory unit to a latch device of said data transfer element during a first clock cycle;

c) transferring said first set of data from said latch device of said data transfer element to said second memory unit during a second clock cycle immediately following said first clock cycle;

d) repeating said steps a) and b) during each consecutive clock cycle occurring after said first clock cycle for each set of data subsequent to said first set of data; and e) repeating said step c) during each consecutive clock cycle occurring after said second clock cycle for each set of data subsequent to said first set of data wherein said first memory unit and said second memory unit can be the DSP internal memory unit or the external memory unit, depending on the direction of data transfer.

7. The method of claim 6 wherein said first memory unit is said external memory unit and said second memory unit is said internal memory unit.

8. The method of claim 6 wherein said first memory unit is said internal memory unit and said second memory unit is said external memory unit.

9. The method of claim 6 wherein said step a) is implemented by an address mechanism of said data transfer element.

10. The method of claim 6 further comprising the step of changing said offset value to a different value to map said first address to a different address in said second memory unit.

* * * * *